Oct. 14, 1969  K. D. GUTTERMAN ET AL  3,473,105

VARIABLE INDUCTIVE CURRENT REGULATOR

Filed Jan. 6, 1967

# United States Patent Office 3,473,105
Patented Oct. 14, 1969

3,473,105
VARIABLE INDUCTIVE CURRENT REGULATOR
Kirill Davidovich Gutterman, 3 Tverskaya-Yamskaya ulitsa 29/6, kv. 8; Nina Dmitrievna Prozorova, Izmailovsky bulvar 12, kv. 48; Alexandr Danilovich Svenchansky, Energeticheskaya ulitsa 8, korpus 1, kv. 47; and Matvei Yakovlevich Smelyansky, Golyanovo, korpus 28, kv. 107; all of Moscow, U.S.S.R.
Filed Jan. 6, 1967, Ser. No. 607,757
Int. Cl. G05f 1/14, 1/24; H02j 1/04
U.S. Cl. 323—6                                                 7 Claims

ABSTRACT OF THE DISCLOSURE

A device for supplying stabilized working current to an electrical installation comprises a capacitance connected in the leading phase circuit of an A.C. three phase supply and a choke coil connected in the lagging phase circuit of the supply, the capacitance and choke coil having equal reactances and being star connected with the primary winding of a power transformer which is connected in series with an additional choke coil having a variable inductive magnetic coupling with the first said choke coil.

---

The present invention relates to devices for the supply of electrical installations and can be used for the supply of electrical installations requiring a stabilized working current at variations of the load circuit resistance, such as vacuum arc furnaces, electronic melting furnaces, D.C. and A.C. plasmatrones and, also, installations for electrochemical processing, electrolysis and arc welding.

A hitherto known device comprises star-connected capacitance, inductance and power transformer primary, the capacitance being inserted into the leading phase circuit and the inductance into the lagging phase circuit.

The known device has several disadvantages, among these being that the value of the output current is not stabilized and cannot be continuously controlled, thus varying with the voltage fluctuations in the supply means.

The known device is intended for maintaining the output current at a single preset level.

An object of the present invention is to provide a novel device that provides a stabilized value of the output current.

Another object of the invention is to provide a device, wherein the stabilized value of the output current can be continuously controlled according to a predetermined function.

A favorable solution of the above and other problems is attained by connecting the power transformed primary in series with at least one additional choke coil having a variable inductive magnetic coupling with the choke coil inserted into the lagging phase circuit.

Control of the magnetic coupling is accomplished by a control unit generating a signal that varies the magnetic coupling factor in the event of an unbalance of the instantaneous value of the mains voltage supplied to the control unit and a signal that varies with the load circuit current according to the predetermined function.

The inductive coupling of the choke coil in series with the transformer and the additional choke coil inserted into the lagging phase may be made cumulative.

The inductive coupling of the choke coil in series with the power transformed primary and the choke coil inserted into the lagging phase circuit may be in opposition.

A variometer with a rotary coil may be used as the inductively coupled choke coils, thus providing either a cumulative or opposing connection of the choke coils without necessarily requiring any changes in their circuit connection.

It is advisable to provide two additional choke coils in series with the power transformer, one of these choke coils having a cumulative connection with the choke coil inserted into the lagging phase circuit, whereas the second choke coil is to be connected in opposition to the choke coil inserted into the lagging phase circuit.

In cases when two additional choke coils are provided in series with the power transformer, they should be made as two coils having a cumulative connection, aligned with the magnetic axis of the choke coil inserted into the lagging phase circuit and shiftable along this axis, the coils being spaced so that their mutual inductance is minimized.

The invention will further be described by way of example with reference to the accompanying drawing in which.

Figure 1:
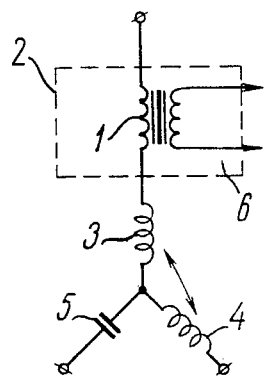
FIG. 1 illustrates the circuit diagram of the device with one additional choke coil.

The device for supply of electrical installations comprises the following star-connected elements: primary winding 1 (FIG. 1) of power transformer 2 connected in series with choke coil 3; choke coil 4 inserted into the lagging phase circuit and magnetically coupled with choke coil 3; capacitance 5 inserted into the leading phase circuit and having a reactance equal to that of choke coil 4.

The resistances of choke coil 4 and capacitance 5 being equal, the current flowing through primary winding 1 (and, correspondingly, through secondary winding 6) of power transformer 2 is independent of the load resistance of transformer 2 owing to the resonance conditions established in the series resonant circuit made up of choke coil 4 and capacitance 5. The current flowing through winding 1 of transformer 2 can be expressed by the following formula:

$$I_L \cong \frac{U_L}{X\left(1 \pm K\sqrt{\frac{X_3}{X}}\right)}$$

where:

$I_L$ is the current flowing through winding 1 of power transformer 2;

$U_L$ is the instantaneous value of the line voltage in the mains;

$X$ is the reactance of chope coil 4 or the equal reactance of capacitance 5;

$X_3$ is the reactance of choke coil 3;

$K$ is the magnetic coupling factor of choke coils 3 and 4.

The "+" sign in the above formula indicates the cumulative connection of choke coils 3 and 4, whereas the "−" sign corresponds to the opposing connection of the same choke coils.

At a continuous control of the magnetic coupling factor $K$ of choke coils 3 and 4, the current flowing through primary winding 1 of power transformer 2 (and a corresponding variation of the current flowing through secondary winding 6) is continuously varied.

Such a continuous control of the magnetic coupling factor can be attained, for example, by varying the spacing of choke coils 3 and 4.

Choke coils 3 and 4 may have either a cumulative or opposing connection.

At a constant range of continuous control of the current flowing through primary winding 1 of power transformer 2, a cumulative connection of choke coils 3 and 4 results in a greater value of the inductance of choke coil 4 and a smaller value of capacitance 5 than is the case when the coils are connected in opposition.

A preferable embodiment wherein both the cumulative and opposing connection of choke coils 3 and 4 is provided can be attained, for example, by the use of a variometer with a rotary coil as choke coils 3 and 4.

In this case, the inductance of choke coil 3 is maximum.

Figure 2:
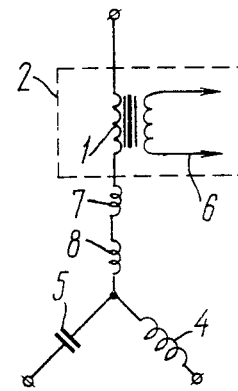
FIG. 2 illustrates the circuit diagram of the device with two additional choke coils.

Joint use of the cumulative and opposing connection is made in a circuit wherein primary winding 1 (FIG. 2) of power transformer 2 is connected in series with two choke coils 7 and 8 having a magnetic coupling with choke coil 4 inserted into the lagging phase circuit, one of said choke coils being connected in opposition to the lagging phase coil, whereas the second choke coil has a cumulative with the lagging phase coil.

Figure 3:
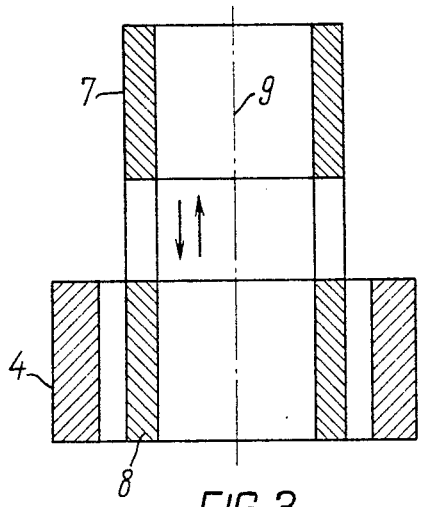
FIG. 3 illustrates the arrangement of two additional choke coils.

Choke coils 7 and 8 (FIG. 3) may be in the form of two coils coaxial with respect to choke coil 4 and spaced along magnetic axis 9 so that the magnetic coupling of choke coils 7 and 8 is minimized. Choke coils 7 and 8 can be shifted synchronously along axis 9.

When choke coil 7 emerges fully from choke coil 4, only choke coil 8 remains magnetically couped with choke coil 4 and inversely, upon complete emergence of choke coil 8 from choke coil 4, only choke coil 7 remains coupled magnetically with choke coil 4. A smooth movement of choke coils 7 and 8 with respect to choke coil 4 from one extreme position to the second extreme position results in a smooth transition from a cumulative to an opposing connection, and vice versa. The sum inductance of choke coils 7 and 8 (FIGS. 2, 3) is twice smaller than the inductance of choke coil 3 (FIG. 1), whereas the inductance of choke coil 4 and the value of capacitance 5 are of the same magnitude as in the case when a variometer with a rotary coil is used as choke coils 3 and 4.

Figure 4:
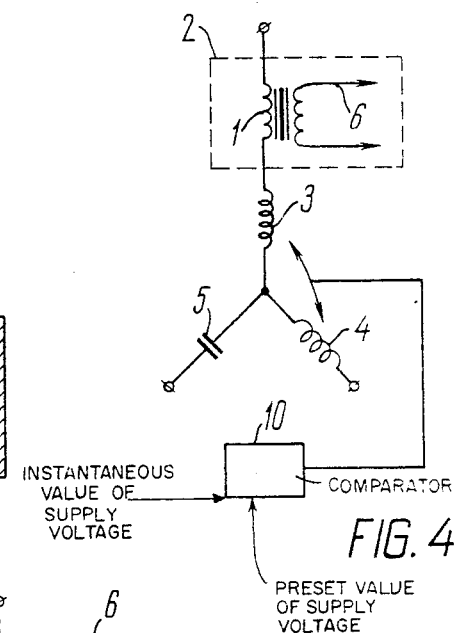
FIG. 4 illustrates the circuit diagram of the device with the control unit.

As the current flowing through primary winding 1 of power transformer 2 (FIG. 1) is in direct proportion to the mains voltage, the mains voltage fluctuations cause a proportional change in the current flowing through winding 1 (and a corresponding change in the current flowing through winding 6) of power transformer 2 and, consequently, the load circuit current can be stabilized for mains voltage fluctuations by a corresponding variation of the magnetic coupling factor of choke coils 3 and 4 this being attained by shifting them with respect to each other by a driving mechanism (not shown in the drawing) operated by a signal supplied from control unit 10 (FIG. 4).

Control unit 10 is a comparator and comprises a combination of conventional elements used for comparing an instantaneous value and a preset value of the mains supply voltage and generates a signal which depends on the degree of unbalance of these voltages.

A programmed variation of the load circuit current may be effected by varying the preset voltage supplied to control unit 10.

When the load is disconnected from the transformer, the device operates under no-load duty conditions characterized by a sharp increase of the voltage across capacitance 5 (FIG. 1).

Figure 5:
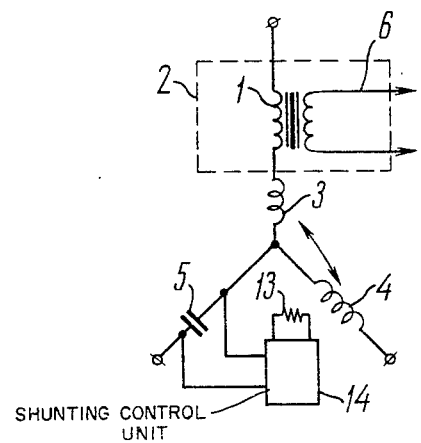
FIG. 5 illustrates the circuit diagram of the device provided with an overvoltage protection unit.

Overvoltage protection can be provided by a device wherein choke coil 4 (FIG. 5) inserted into the lagging phase circuit comprises an additional winding 13 connected in parallel with capacitance 5 through control unit 14. Control unit 14 operates when the voltage across capacitance 5 exceeds a certain fixed value and shunts capacitance 5, thus upsetting the resonance of choke coil 4 and capacitance 5 and eliminating the overvoltage across capacitance 5.

The use of the device proposed herein above allows reduction of the cost of the source of supply of vacuum arc furnaces and electrochemical installations and also guarantees a high degree of stability of the working current.

As compared with prior art devices, the present invention has the advantage of a leading power factor.

We claim:

1. A device for supply of electrical installations from A.C. three-phase mains comprising: a capacitance inserted into the leading phase circuit; a choke coil having a reactance equal to that of the aforesaid capacitance and inserted into the lagging phase circuit, said capacitance and choke coil being star-connected; a power transformer whose primary winding is included in the star-connection; at least one additional choke coil connected in series with the transformer primary winding and having a variable inductive magnetic coupling with the aforesaid choke coil inserted into the lagging phase circuit.

2. A device according to claim 1, wherein the magnetic coupling is controlled by a control unit generating a control signal which varies the magnetic coupling factor upon unbalance of the instantaneous mains voltage supplied to the aforesaid control unit and a signal varying with the load circuit according to a predetermined function.

3. A device according to claim 1, comprising an additional choke coil series-connected with the primary winding of the power transformer and having a cumulative inductive coupling with the choke coil inserted into the lagging phase circuit.

4. A device according to claim 1, comprising an additional choke coil series-connected with the primary winding of the power transformer and having an opposing inductive coupling with the choke coil inserted into the lagging phase circuit.

5. A device according to claim 1, wherein a variometer with a rotary coil is employed as the inductively coupled choke coils, thus providing a cumulative or opposing connection of the choke coils without necessitating a changeover of the coil connections.

6. A device according to claim 1, wherein the power transformer is connected in series with two additional choke coils, one of which has a cumulative connection with the choke coil inserted into the lagging phase circuit, whereas the second coil is connected in opposition to the choke coil inserted into the lagging phase circuit.

7. A device according to claim 6, wherein the additional coils series-connected with the primary winding of the power transformer are in the form of two opposing coils aligned with the magnetic axis of the choke coil inserted into the lagging phase circuit, said two opposing coils being provided with means for shifting them along the magnetic axis and spaced so that their mutual inductance is minimized.

References Cited

UNITED STATES PATENTS

| 1,738,726 | 12/1929 | Philip | 323—108 |
| 2,437,093 | 3/1948 | Huge | 321—68 |
| 2,486,004 | 10/1949 | Clark | 323 122 X |
| 3,214,681 | 10/1965 | Tango et al. | 323—76 |

JOHN F. COUCH, Primary Examiner

A. D. PELLINEN, Assistant Examiner

U.S. Cl. X.R.

323—53, 61